(12) United States Patent
Thompson

(10) Patent No.: US 12,097,647 B2
(45) Date of Patent: Sep. 24, 2024

(54) ISOSTATIC SIDE-PRESSURE SHIELDED COMPOSITE CONSOLIDATION

(71) Applicant: XTEK LTD, Fyshwick (AU)

(72) Inventor: David Thompson, Fyshwick (AU)

(73) Assignee: XTEK LTD, Fyshwick (AU)

( * ) Notice: Subject to any disclaimer, the term of this patent is extended or adjusted under 35 U.S.C. 154(b) by 0 days.

(21) Appl. No.: 18/387,969

(22) Filed: Nov. 8, 2023

(65) Prior Publication Data

US 2024/0075661 A1 Mar. 7, 2024

Related U.S. Application Data

(62) Division of application No. 16/955,637, filed as application No. PCT/AU2018/051350 on Dec. 18, 2018, now abandoned.

(30) Foreign Application Priority Data

Dec. 18, 2017 (AU) ................................ 2017905053

(51) Int. Cl.
- *B29C 43/36* (2006.01)
- *B29C 43/10* (2006.01)

(Continued)

(52) U.S. Cl.
CPC .......... *B29C 43/3607* (2013.01); *B29C 43/10* (2013.01); *B29C 70/46* (2013.01);

(Continued)

(58) Field of Classification Search
CPC .......... B29C 70/302; B29C 2043/3655; B29C 2043/3647; B29C 70/44;

(Continued)

(56) References Cited

U.S. PATENT DOCUMENTS

| 2,380,573 A | * | 7/1945 | Beasecker | ............. B27D 1/083 |
| | | | | 269/287 |
| 3,146,148 A | * | 8/1964 | Mitchella | ............. B21D 47/00 |
| | | | | 264/553 |

(Continued)

FOREIGN PATENT DOCUMENTS

| DE | 10150659 | 5/2003 | |
| WO | 2008/098771 | 8/2008 | |
| WO | WO-2013060966 A1 | * 5/2013 | ............. B29C 33/30 |

OTHER PUBLICATIONS

Hou, T.H., B.J. Jensen, Double-Vacuum-Bag Technology for Volatile Management in Composite Fabrication, Polymer Composites (2008), pp. 906-914. (Year: 2008).*

(Continued)

*Primary Examiner* — Matthew J Daniels
(74) *Attorney, Agent, or Firm* — Akerman LLP

(57) ABSTRACT

A mold for use in the production of a ballistic article from a composite laminate stacked material wherein the mold has a sliding sealing section that nests with a outer permitter section and base portion so as to shield the sides of the composite laminate stacked material from applied isostatic pressure applied when in an autoclave. By shielding the sides of the composite laminate stacked material excess resin matrix material can be forced from the composite laminate stacked material to provide a uniform composite article with reduced weight and reduced thickness.

3 Claims, 6 Drawing Sheets

(51) Int. Cl.
*B29C 70/44* (2006.01)
*B29C 70/46* (2006.01)
*B29C 70/54* (2006.01)
*B29C 43/56* (2006.01)
*B29L 31/00* (2006.01)

(52) U.S. Cl.
CPC ........ *B29C 70/54* (2013.01); *B29C 2043/562* (2013.01); *B29K 2995/0089* (2013.01); *B29L 2031/768* (2013.01)

(58) Field of Classification Search
CPC .... B29C 2043/3652; B29C 2043/3644; B29C 33/50; B29C 33/0038
See application file for complete search history.

(56) References Cited

U.S. PATENT DOCUMENTS

| | | | | |
|---|---|---|---|---|
| 3,861,977 | A * | 1/1975 | Wiley | B29C 63/16 264/510 |
| 4,065,340 | A * | 12/1977 | Dickerson | B29C 70/44 156/289 |
| 4,311,661 | A * | 1/1982 | Palmer | B29C 70/44 264/102 |
| 4,734,155 | A * | 3/1988 | Tsunoda | B30B 5/02 100/211 |
| 4,869,770 | A * | 9/1989 | Christensen | B29C 70/44 156/286 |
| 5,040,962 | A * | 8/1991 | Waszeciak | B29C 70/48 425/398 |
| 5,108,532 | A * | 4/1992 | Thein | B32B 37/1009 156/308.2 |
| 5,116,216 | A * | 5/1992 | Cochran | B29C 70/44 156/286 |
| 5,152,949 | A | 10/1992 | Leoni et al. | |
| 5,322,665 | A * | 6/1994 | Bernardon | B29C 70/44 264/316 |
| 5,370,598 | A | 12/1994 | Corneau, Jr. | |
| 6,083,448 | A * | 7/2000 | Henrio | B29C 70/541 264/258 |
| 6,796,784 | B1 * | 9/2004 | Andre | B29C 70/44 425/389 |
| 6,929,770 | B2 * | 8/2005 | Caldwell, Jr. | B29C 70/48 264/102 |
| 6,967,000 | B2 * | 11/2005 | Vaara | B29C 70/44 264/510 |
| 7,306,450 | B2 * | 12/2007 | Hanson | B29C 70/549 425/408 |
| 7,690,911 | B2 * | 4/2010 | Haney | B29C 70/443 425/388 |
| 8,097,198 | B2 * | 1/2012 | Krogager | B29C 70/44 264/234 |
| 8,491,297 | B2 * | 7/2013 | Tricot | B29C 70/342 425/389 |
| 8,535,042 | B1 * | 9/2013 | Kirkpatrick | B29C 70/461 425/389 |
| 8,979,523 | B2 | 3/2015 | Thompson | |
| 9,162,397 | B2 * | 10/2015 | Katahira | B29C 70/865 |
| 9,415,549 | B2 * | 8/2016 | Mathon | B29C 33/30 |
| 9,592,625 | B2 * | 3/2017 | Plante | B29C 70/46 |
| 10,994,504 | B2 * | 5/2021 | Techer | B29D 99/0025 |
| 11,479,002 | B2 * | 10/2022 | Banhos | F01D 5/284 |
| 2005/0086916 | A1 * | 4/2005 | Caron | B29C 70/544 55/382 |
| 2006/0068170 | A1 | 3/2006 | Hanson | |
| 2006/0170127 | A1 * | 8/2006 | Hirayama | B29C 70/44 425/389 |
| 2007/0194491 | A1 * | 8/2007 | Krogager | B29C 70/885 264/258 |
| 2009/0321978 | A1 * | 12/2009 | Kurtz | B29C 70/44 264/258 |
| 2010/0126658 | A1 * | 5/2010 | De Vita | B29C 70/544 156/243 |
| 2011/0085911 | A1 * | 4/2011 | Schroder | B29C 70/44 416/223 R |
| 2011/0272852 | A1 * | 11/2011 | Blot | B29C 33/48 425/150 |
| 2013/0233470 | A1 * | 9/2013 | De Mattia | B32B 37/16 156/494 |
| 2013/0234352 | A1 * | 9/2013 | De Mattia | B29C 70/44 264/40.5 |
| 2014/0161922 | A1 * | 6/2014 | Thompson | B32B 37/10 425/405.2 |
| 2015/0099105 | A1 * | 4/2015 | Kurtz | B64C 1/064 156/243 |
| 2015/0217487 | A1 * | 8/2015 | Louie | B32B 5/00 428/35.2 |
| 2016/0297153 | A1 | 10/2016 | Henrio et al. | |

OTHER PUBLICATIONS

Mujahid, Y., N. Sallih, M.Z. Abdullah, A Comparison of Single-Vacuum-Bag and Double-Vacuum-Bag Methods for Manufacturing High-Quality Laminated Composites, in Advances in Manufacturing Engineering—Selected Articles from ICMMPE 2019 (2021), pp. 457-467. (Year: 2021).*

Written Opinion of the International Searching Authority issued in connection with PCT/AU2018/051350.

International Search Report issued in connection with PCT/AU2018/051350.

* cited by examiner

ISOSTATIC SIDE-PRESSURE SHIELDED COMPOSITE CONSOLIDATION

CROSS-REFERENCE TO RELATED APPLICATIONS

This application is a divisional of U.S. patent application Ser. No. 16/955,637, filed Jun. 18, 2020, which is a national phase of PCT/AU2018/051350, filed Dec. 18, 2018, and claims priority to AU 2017905053, filed Dec. 18, 2017, the entire contents of each of which are hereby incorporated by reference.

BACKGROUND

For many years the consolidation of thermoplastic and thermosetting materials to form composite laminates has been accomplished through the simultaneous application of elevated pressure and temperature. This consolidation process is usually applied in a hydraulic press with thermally regulated platens, or, in an autoclave with a pressurised and thermally regulated gas.

Consolidation of laminates within a hydraulic press fitted with thermally regulated platens, commonly referred to as 'hydraulic axial pressing', usually allows the application of a high-magnitude of consolidation pressure directed through opposing rigid surfaces. This high-magnitude of consolidation pressure is commonly associated with the production of high-performance composite laminates. In some fields, such as the production of ballistic protection laminates, hydraulic axial pressing can fabricate composite articles with a relatively high resistance to penetration. However, hydraulic axial pressing also has limitations, such as a low-rate of production, costly tooling and a relatively high standard deviation (SD) associated with ballistic testing results.

Consolidation of laminates within an autoclave containing a pressurised and thermally regulated gas, commonly referred to as 'autoclaving', usually allows the application of a low-magnitude of isostatic consolidation pressure. This autoclaving process is widely employed within industry and is associated with the production of both large parts and in batches of significant part quantities. In some fields, such as the production of ballistic protection laminates, autoclaving can have limitations, such as the need for a relatively high proportion of matrix (resin) to achieve adequate laminate consolidation. Most significantly, autoclaving is associated with the production of composite articles offering relatively low resistance to penetration.

An adaption of the autoclaving process is to substitute the gaseous fluid for a liquidous fluid and subsequently the pneumatic application of consolidation pressure with the hydraulic application of consolidation pressure. In such an application, the processing volume that contains the pressurised liquidous fluid is referred to as a hydroclave, and the process referred to as 'hydroclaving'. A form of hydroclaving is employed within a known composite consolidation process, as disclosed within U.S. Pat. No. 8,979,523 B2. This process combines the production efficiencies of autoclaving with the high-magnitude of consolidation pressure of hydraulic axial pressing.

WO2008/098771 describes a process for manufacturing a molded article that uses known isostatic pressurizing processes to consolidate a stack of laminate material under very specific conditions, comprising placing the stack of specific laminate materials and binders in an isostatic pressurizing means and consolidating under specific pressures and elevated temperatures.

It has been found that for a ballistic protection laminate, application of a high-magnitude of isostatic consolidation pressure acting on a composite laminate can have a detrimental effect on the resultant laminate's resistance to penetration.

SUMMARY OF THE INVENTION

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

The present invention has been specifically devised to provide a shielding of consolidation pressure to the sidewalls of a composite laminate of stacked material, which may or may not be pre-preg material, being synthetic fibres, such as, but not limited to, aramid material such as Kevlar®, high modulus polyethylene (HMPE) material such as Ineggra®, high modulus polypropylene (HMPP), ultra-high molecular weight polyethylene (UHMWPE) such as Dyneema® or other suitable ballistic laminate material under consolidation by isostatic pressure. Layers of resin compound may be layers in the stack if required. When the sidewalls are shielded, the pressure acting on the remaining faces of the laminate provide a compression that acts to extrude the laminate at its sidewalls in an action that subsequently tensions the reinforcing fibres. The resulting laminate, whilst maintaining the same volume, is thinner and slightly elongated in its major dimensions. This tensioning of reinforcing fibres has a beneficial effect on the resultant laminate's resistance to penetration, which, when coupled with the relatively low standard deviation (SD) associated with ballistic testing results for isostatically consolidated laminates, yields outstanding performance.

An isostatic side-pressure shielding (ISPS) composite consolidation, in accordance with an embodiment of the invention, comprises a fixture that shields the sidewalls of a laminate from pressure whilst the laminate and fixture are together exposed to isostatic pressure.

In preference, the said fixture comprises a circumferential sidewall section and that provides pressure shielding of the laminate sidewall, an enclosing profiled section that governs the curvature of the laminate and a sealing section. The circumferential sidewall section may take any such shape as required In preference, the said sealing section contains an opening that allows direct application of isostatic pressure to all but the perimeter of the laminate surface it contacts.

In preference, the said enclosing profile section and the said sealing section both contact the said circumferential section and the non-sidewall laminate faces and form a sealed void between the said circumferential section and the sidewalls of the laminate. The said sealing section and the said enclosing profiled section are able to move towards each other under pressure and, in preference, their opposing faces are an offset of the same profile, dictated by the laminate thickness.

In various embodiments of the invention, the said circumferential section and the said enclosing profile section may be combined, or, the said circumferential section and the said sealing section may be combined.

In operation, the laminate and said fixture are typically enclosed in a reusable silicone membrane and heat-sealed in a disposable plastic bag, fused with the contents and surrounds under vacuum. The said silicone membrane can be comprised of multiple separate sections and is ideally preformed to fit the laminate and said fixture accurately. The said silicone membrane is adequately soft as to transfer the applied pressure to the exposed laminate and said fixture surfaces without significant loss of isostatic nature. The said heat-sealed disposable plastic bag containing the said silicone membrane, said fixture and laminate are cycled through the simultaneous and controlled application of elevated isostatic pressure and temperature to ISPS consolidate the laminate, ideally within XTEK Limited's XTclave™ composite consolidation process. The laminate is subsequently extracted from the said heat-sealed disposable plastic bag, said silicone membrane and said fixture and typically subjected to finishing processes.

In preference, the said circumferential section, said enclosing profiled section and said sealing section are constructed from rigid and strong materials, such as metals, metal alloys or composites. In further preference, these materials should have favourable thermal conductivity. Various successful embodiments of the invention have used steel alloy (AS 1444-1996-4140), aluminium alloy (ASTM B 209 6061-T6) and carbon fibre reinforced epoxy resin matrix (GMS Composites EP-250) designed for high temperature resistant composite tooling applications. It has been found advantageous to employ a lubricant, such as lithium grease containing molybdenum disulphide, to assist motion between the said sealing section and the said circumferential section.

In preference, the circumferential sidewall section is non-circular.

In preference, the application of pressure to the fixture acts to close the interfaces between the said circumferential section and the said sealing section and enclosing profiled section. In further preference, the said sealing section is engineered to elastically deform under pressure to maintain contact with the said circumferential section. Harnessing applied pressure to energise the sealing actions improves function and reliability.

Subject to the fluidity of the laminate undergoing ISPS composite consolidation, it may be advantageous to position a membrane between the said sealing section and the laminate. In preference, this said membrane extends over the entire surface of the laminate. This said membrane functions to minimise marking of the laminate at the perimeter of its interface with the said sealing section. Various successful embodiments of the invention have used thin (0.2 mm) brass (Alloy C26000) and polycarbonate (0.5 mm) materials for this said membrane. Most importantly, this membrane must be adequately soft as to transfer the applied pressure to the exposed laminate and without significant loss of isostatic nature.

In a further form of the invention, there is a mold for a ballistic article by consolidating a laminate stack, the mold including;
  a sliding sealing section, and
  a base profile section having a circumferential upwardly extending side wall with an inner face and a base profile surface;
  the circumferential upwardly extending side wall having an internal dimension that is greater than the outer dimension of the laminate stack to be consolidated;
  wherein the sliding sealing section forms a sliding fit with the inner face of the circumferential upwardly extending side wall.

In preference, the sealing section shields the lateral sides of the laminate stack from external pressure.

In preference, the internal dimension of the circumferential upwardly extending sidewall of the base profile section is between 0.001 mm to 25 mm greater than the outer dimension of the laminate stack to be consolidated.

In preference, the sealing section is a ring or band.

In preference, the sliding sealing section is a ring or a band having an angled profile.

In preference, the sliding sealing section is a ring or a band having a bevelled profile.

In preference, the sliding sealing section is a ring or a band having an "L"-shaped profile.

In preference, the sealing section is a hoop or band having a substantially constant profile.

In preference, the sealing section is deformable.

In preference, the base profile section is two piece.

In preference, the base profile section is two piece, including a base profile section and a circumferential sidewall section.

In preference, the mold is a molding tool.

In a further form of the invention there is provided a process for the preparation of a molded article including the steps of:
  forming a stack of laminate material;
  providing an isostatic pressurizing means;
  placing the stack of laminate material in a mold, the mold having a sliding sealing section, and
  a base profile section having a circumferential upwardly extending side wall with an inner face and a base profile surface;
  the circumferential upwardly extending side wall of the base profile section having an internal dimension that is greater than an outer dimension of the laminate stack to be consolidated;
  applying an isostatic pressure to the exterior surfaces of the sliding sealing ring,
  wherein the sliding sealing section forms a sliding fit with the inner face of the circumferential upwardly extending side wall under the isostatic pressure.

In preference, the molded article is a ballistic article.

In preference, the sealing section is deformable.

In preference, the stack of laminate material has a top surface, bottom surface and a side surface.

In preference the isostatic pressure is prevented from being applied the side surface of the laminate material.

BRIEF DESCRIPTION OF THE DRAWINGS

By way of example/illustration only, an embodiment of the invention is described with reference to the accompanying figures, in which.

DESCRIPTION

The term "laminate stack" as used herein refers to a stack of material, such as ballistic material or ballistic laminate sheets layered on top of each other so as to form a pile or stack.

The term "prepreg" as used herein refers to fabric material, such as ballistic material of ballistic laminate sheets, that have been pre-impregnated with a resin system or matrix.

Figure 1:
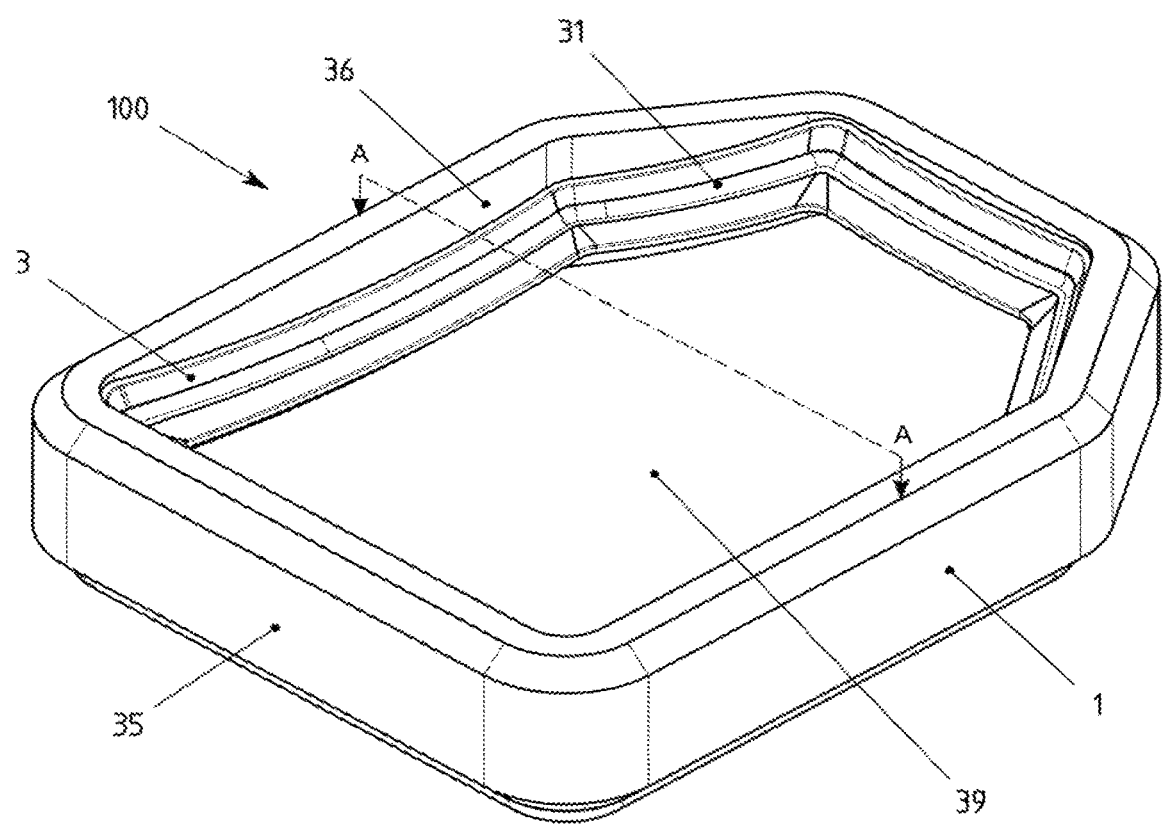
FIG. 1. is a perspective view of a first embodiment of the invention.
Figure 4:
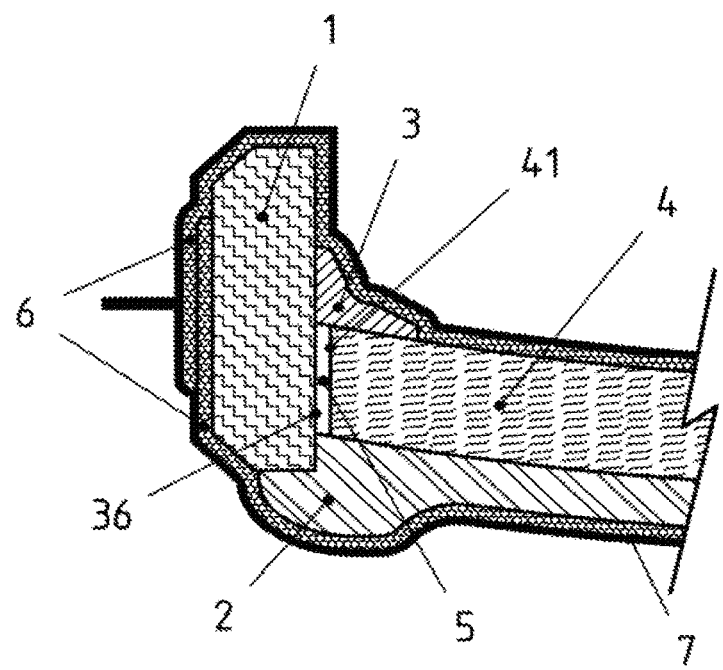
FIG. 4 is a partial sectioned view of a side section of the present invention with a laminate stack in place.

With reference to FIG. 1, there is shown a composite consolidation apparatus or mold (100) of the present invention when assembled, the circumferential section (1) fits snugly over the upwardly extending base profile surface (39), there being a tight fit between the faces (40) and (36) of the circumferential section. A laminate stack (4) is then placed within the opening (37), with the size of the laminate stack (4) being less than the opening so that there is between 0 mm and 25 mm between a lateral side (41) of a laminate stack of prepreg material (4) and the inner surface (36) of the circumferential section (1). FIG. 4, for example, shows a gap of >0 mm between the inner face (36) of the circumferential section (1) and the lateral side face (41) of the laminate stack (4).

The sealing section (3) then fits snugly into the opening (37) of the circumferential section (1), with a sliding fit between the outer face (28) of the sealing section (3) and the inner face (36) of the circumferential section (1). This close fitting between the sealing section (3) and the circumferential section (1) can be seen in FIGS. 3 and 4.

Figure 2:
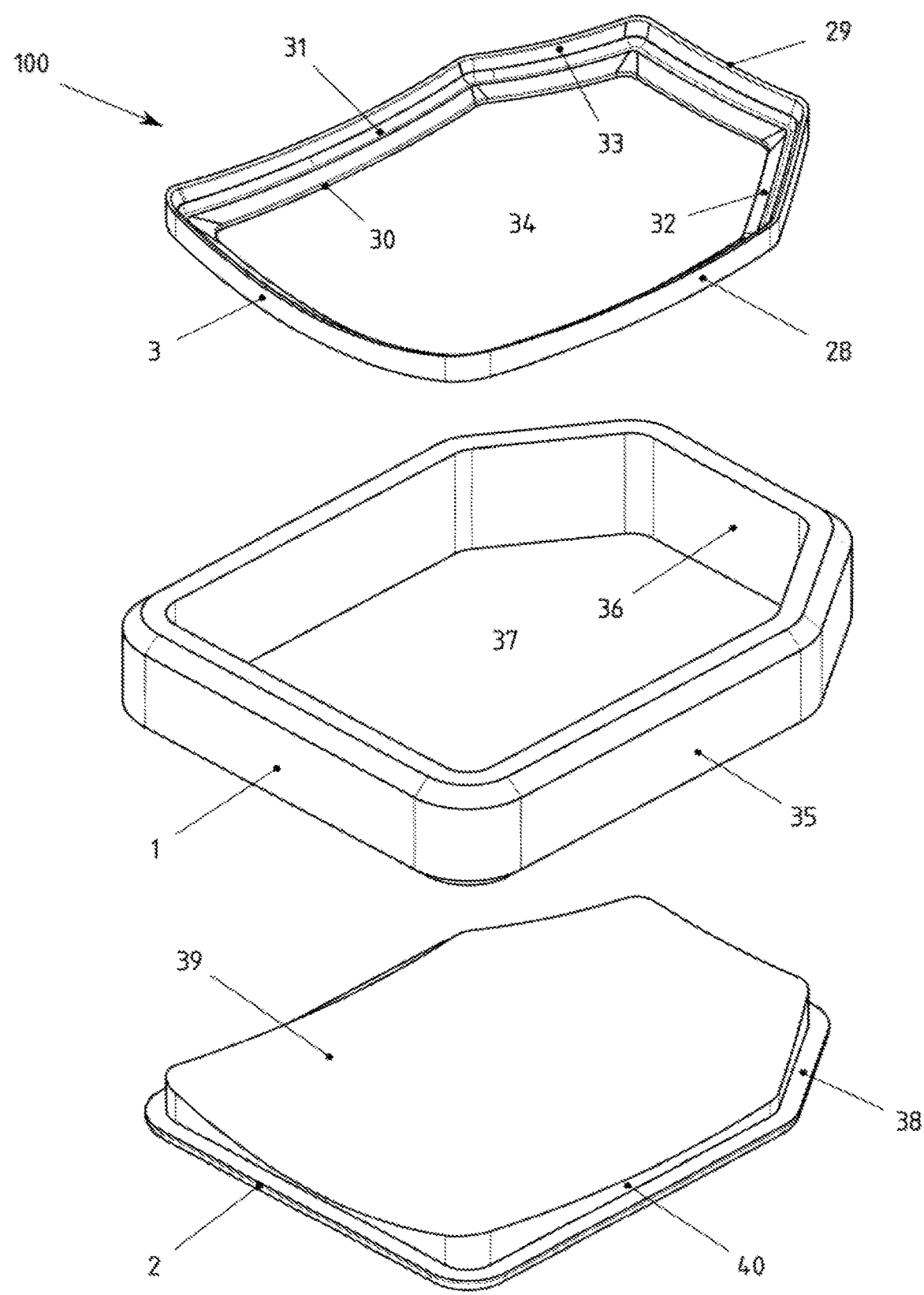
FIG. 2 is a perspective exploded view of the embodiment shown in FIG. 1.

Referring to FIG. 2, being, the mold apparatus (100) includes a sealing section (3), a circumferential section (1) and a profile section (base section) (2). The sealing section (3) is shaped so as to form a sliding fit within the circumferential section (1), which in turn is shaped to mate with a portion of the profile section (base section) (2).

Figure 5:
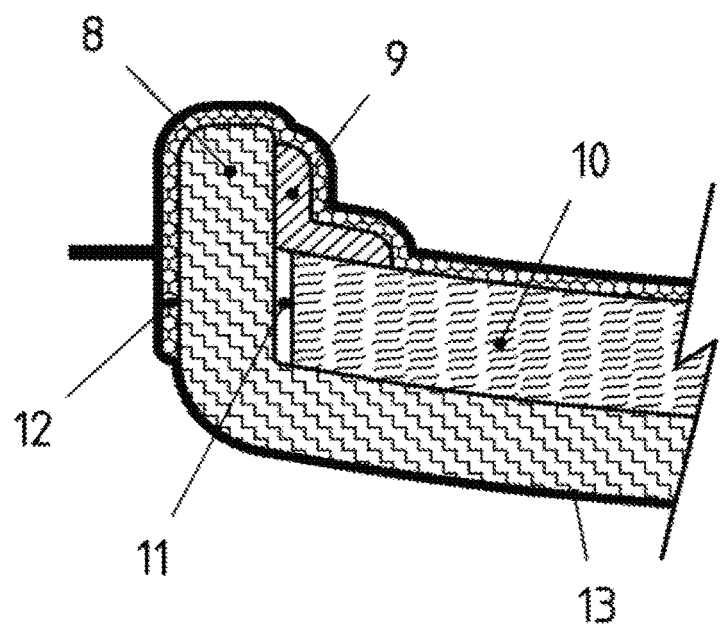
FIG. 5 is a partial sectioned view of a second embodiment of the invention with a laminate stack in place.
Figure 7:
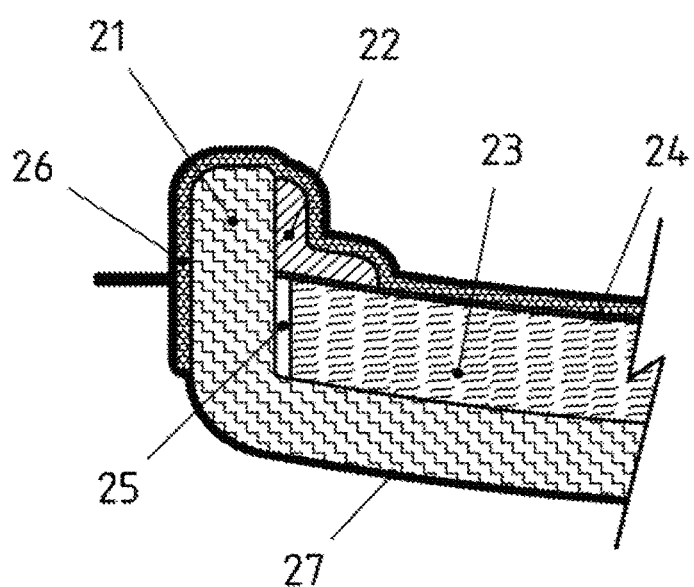
FIG. 7 is a partial sectioned view of a fourth embodiment of the invention with a laminate stack in place.

The sealing section (3) has an outer surface (28), an inner surface (31), a top edge (29), a bottom edge (30) and an opening (34). The inner surface (31) has bevelled sloping faces (32) and (33), to provide a substantially constant profile about the hoop or band, which in this embodiment is a bevelled or angled profile but may also be an "L"-shaped profile as shown in FIGS. 5 and 7. The outer surface (28) is shaped to match an inner surface (36) of the circumferential section (1) so as to provide a tight sliding fit when the sealing section (3) is inserted into the circumferential section (1). The sealing section (3) can be made from a deformable material, such that any pressure applied to the sealing section (3) can generate an energized seal between itself and the inner surface (36) of the circumferential section (1).

The circumferential section (1) includes an outer surface (35) and an inner surface (36), both being parallel to one another. The opening (37) is of a matching shape to the outer surface (28) of the sealing section (3) so as to allow the sealing section (3) to be inserted therein.

The profile section (base section) (2) has a flange section (38) about its periphery so that the circumferential section (1) can be placed directly on the flange surface (38) so that a portion of the inner face (36) abuts, or is contiguous with, the face (40) of the profile section (2) with a tight fit. The surface (39) of the profile section (base section) (2) carries the shape of a face of the ballistic article that is to be produced. The surface (39) may be smooth or patterned as required. As shown in FIG. 5, the surface (39) is slightly concave so as to create a curved ballistic article. Other shapes are considered to fall within the scope of the present invention.

Figure 3A:
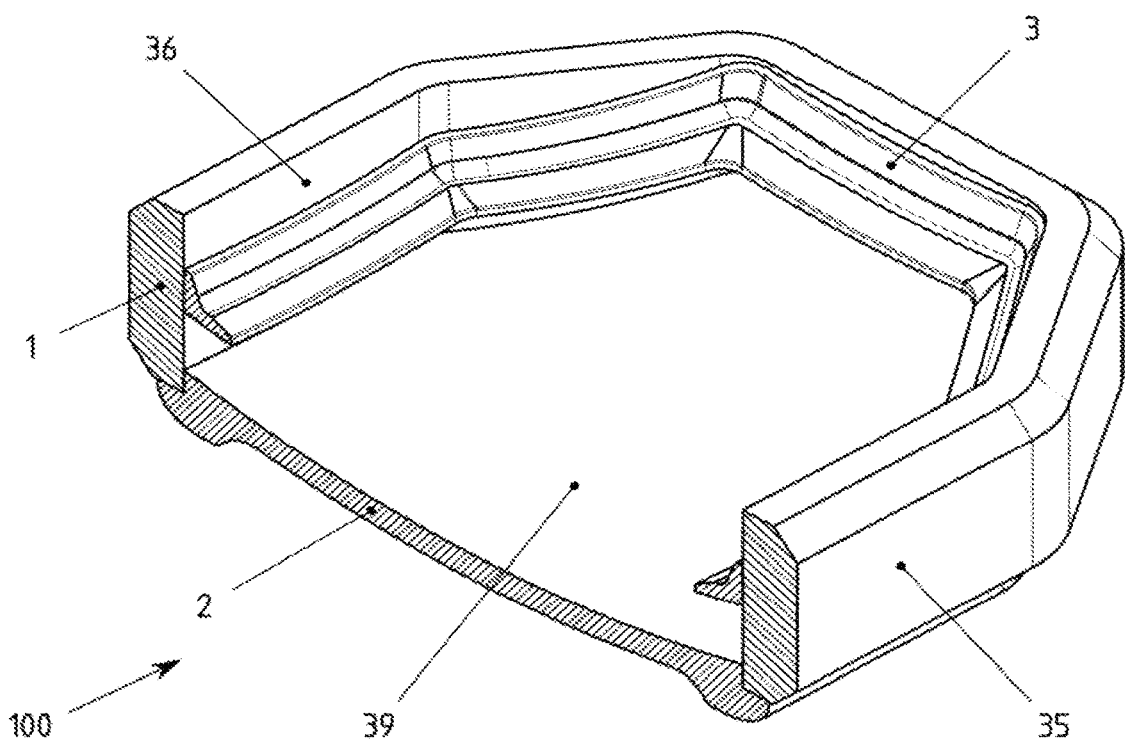
FIG. 3A is a perspective cross sectional view of FIG. 1 along A-A, without a laminate stack in place.
Figure 3B:
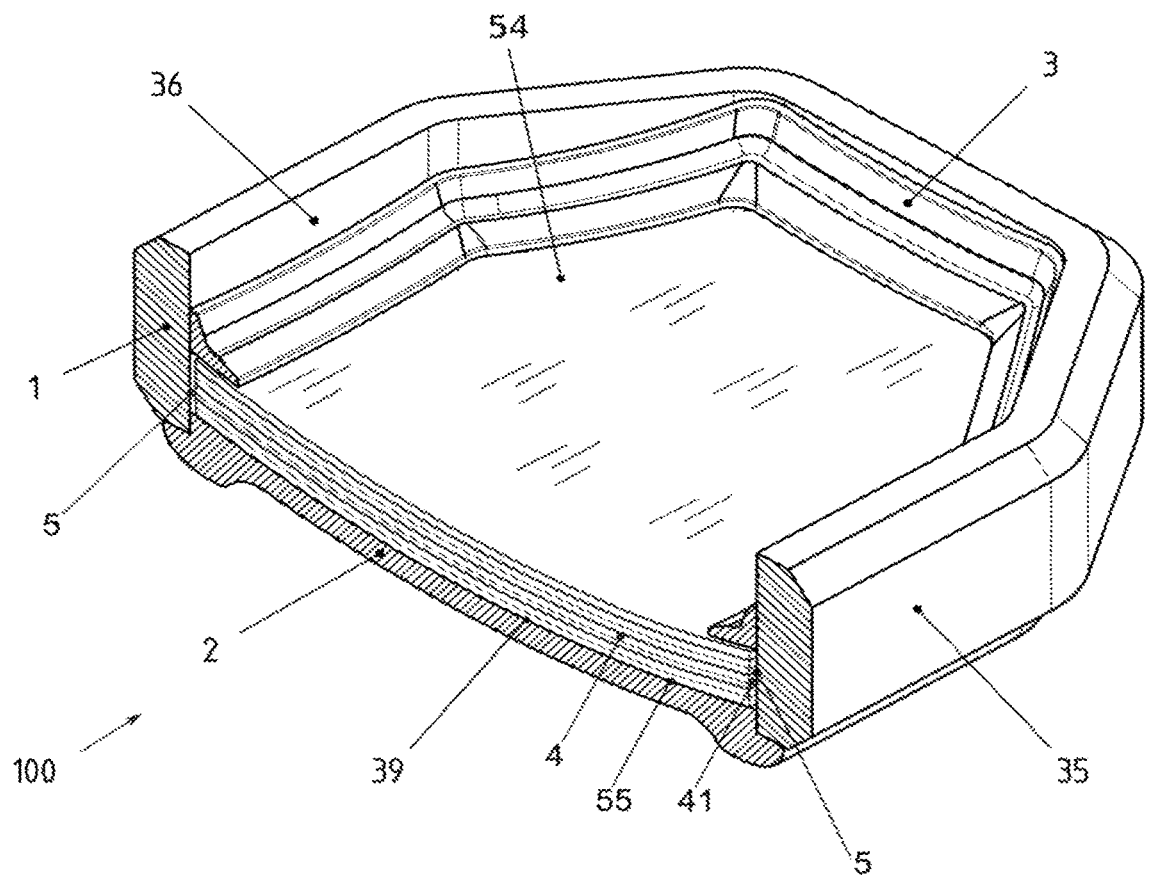
FIG. 3B is a perspective cross sectional view of FIG. 1 along A-A, with a laminate stack in place.

A cross section of the composite consolidation apparatus or mold (100) is shown in FIG. 3A, which is along the lines A-A from FIG. 1. The composite consolidation apparatus or mold (100) in FIG. 3A does not have any laminate stack in place and shows the arrangement of the circumferential section (1) with the sealing section (3) slidingly inserted so that it nests up against the inner surface (36). FIG. 3B is the same view as FIG. 3A with a laminate stack (4) in place. The laminate stack (4) has a top or upper surface (54), a bottom surface (55) and side surfaces (41). When the circumferential section (1) and profile section (base section) (2) are placed together the laminate stack (4) is placed into the opening (37) of the circumferential section (1) so that the bottom face (55) of the laminate stack (4) rests against the surface (39) of the profile section (base section) (2).

The sealing section (3) is then inserted into the opening (37) of the circumferential section (1) and a portion of the upper surface (54) of the laminate stack (4) is left exposed. The inner diameter of the opening (37) of the circumferential section (1) is equal to or greater than an outer diameter of the laminate stack (4). When the outer diameter of the laminate stack (4) is less than the inner diameter of the opening (37) of the circumferential section (1) a sealed void (5) is formed.

The assembled composite consolidation apparatus or mold (100) with laminate stack (4) in place is then inserted into a flexible silicone membrane (6), sealed under vacuum and into a protective plastic bag (7) and then placed into a suitable consolidation apparatus such as a high pressure autoclave, the resulting pressure applied can then exert isostatic pressure to the top surface (54) of the laminate stack (4) as well as against the bevelled sloping surface (31) of the sealing section (3) thus providing isostatic side-pressure shielding to the sides (41) of the laminate stack (4). As such, under consolidation conditions (pressure and heat) excess matrix (resin) material is forced to the sides (41) of the laminate stack (4) and into the sealed void (5), isostatic pressure thus prevented from being applied by the consolidation conditions to the sides (41) of the laminate stack (4).

Referring to FIG. 4, this shows a partial sectioned view isostatic composite consolidation apparatus or mold (100) of the present invention, showing the fixture or composite consolidation apparatus or mold, comprised of the circumferential section (1), enclosing profiled section (2) and sealing section (3), containing the laminate stack (4). The sealed void (5) is evident. The fixture is contained within a two-part silicone membrane (6) that is contained within a sealed plastic bag (7). This form of the invention is modular in that it allows for alternate versions of the enclosing profiled section (2) to be employed; necessary when consolidating laminate stacks of varied thickness.

FIG. 5 is a partial sectioned view of a second embodiment of the invention, showing the fixture, comprised of the circumferential section combined with the enclosing profiled section (8) and sealing section (9), containing the laminate stack (10). The sealed void (11) is evident. The fixture is contained within a silicone membrane (12) that is contained within a sealed plastic bag (13). This embodiment of the invention is compact although not modular; being specific to a laminate stack thickness.

Figure 6:
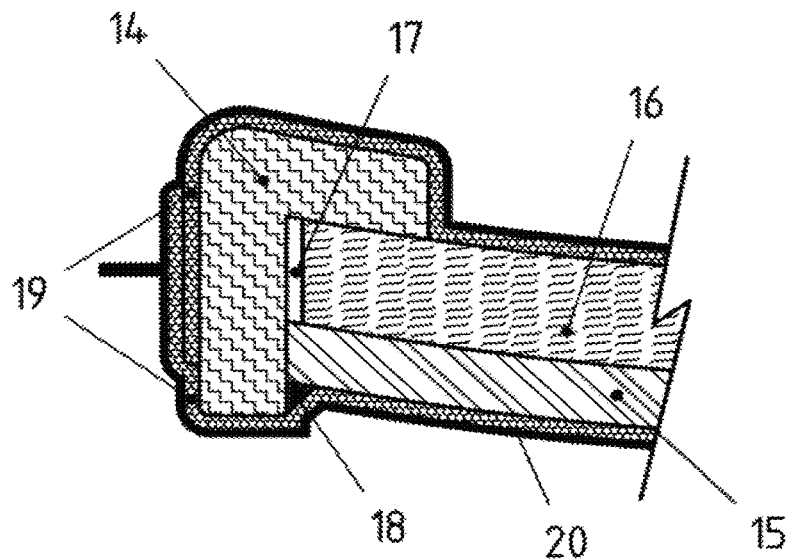
FIG. 6 is a partial sectioned view of a third embodiment of the invention with a laminate stack in place.

FIG. 6 is a partial sectioned view of a third embodiment of the invention, showing the fixture, comprised of the circumferential section combined with the L-shaped profile sealing section (14) and enclosing profiled section (15), containing the laminate stack (16). The sealed void (17) is evident. An additional sealing ring (18), made from a suitable sealing material such as rubber or other deformable material, is positioned on a rear face of the enclosing profiled section (15) so as to create a firm seal between the enclosing profiled section (15) and the L-shaped profile sealing section (14). The fixture is contained within a two-part silicone membrane (19) that is contained within a sealed plastic bag (20). This form of the invention is compact and modular.

FIG. 7 is a partial sectioned view of a fourth embodiment of the invention, showing the fixture, comprised of the circumferential section combined with the enclosing profiled section (21) and sealing section (22), containing the laminate stack (23). A planar sealing membrane (24) is positioned between the sealing section (22) and the laminate stack (23) to create a sealing effect between sealing section (22) and the laminate stack (23). The planar sealing membrane (24) can be used in conjunction with any of the forms of the present invention as disclosed so as to enhance said selling effect between the laminate stack and any adjacent sealing surface. The sealed void (25) is evident. The fixture is contained within a silicone membrane (26) that is contained within a sealed plastic bag (27). This embodiment of the invention employs an additional membrane (24) to minimise marking of the laminate stack (23) at the perimeter of its interface with the sealing section (22).

The ballistic articles formed by the present invention have been shown to have significantly improved ballistic resistance compared to similar ballistic articles produced by known isostatic pressure processes and equipment by allowing excess prepreg matrix material to be forced out of the main body of the laminate stack. In addition, the ballistic articles formed by the present invention are also thinner and lighter than those produced by other isostatic processes, thus providing a significant improvement over that which is already known.

What is claimed is:

1. A process for the preparation of a molded article including the steps of:
    forming a stack of laminate material;
    providing an isostatic pressurizing means;
    placing the stack of laminate material in a mold, the mold having a sliding sealing section, and a base profile section having a circumferential upwardly extending side wall with an inner face and a base profile surface;
    the circumferential upwardly extending side wall of the base profile section having an internal dimension that is greater than an outer dimension of the laminate stack to be consolidated;
    placing the mold into a flexible membrane;
    placing the mold in a plastic bag and sealing;
    applying an isostatic pressure to the external surfaces of the sliding sealing section;
    wherein the sliding sealing section forms a sliding fit with the inner face of the circumferential upwardly extending side wall under the isostatic pressure.

2. The isostatic composite consolidation process of claim 1, wherein the sliding sealing section is deformable.

3. The isostatic composite consolidation process of claim 1, wherein the stack of laminate material has a top surface, bottom surface and a side surface, and wherein a sealed void is formed between the circumferential upwardly extending side wall of the base profile section and the side surface of the stack of laminate material.

* * * * *